(No Model.)

L. LABORDE.
APPARATUS FOR DESTROYING PHYLLOXERA.

No. 317,802. Patented May 12, 1885.

Witnesses:
Harry Drury
John M. Clayton

Inventor:
Ludovic Laborde,
by his Attorneys
Howson & Sons

N. PETERS, Photo-Lithographer, Washington, D. C.

UNITED STATES PATENT OFFICE.

LUDOVIC LABORDE, OF FLEURANCE, GERS, FRANCE.

APPARATUS FOR DESTROYING PHYLLOXERA.

SPECIFICATION forming part of Letters Patent No. 317,802, dated May 12, 1885.

Application filed February 20, 1884. (No model.) Patented in France July 31, 1883, No. 156,822; in Italy December 29, 1883, No. 16,289, and in Spain April 21, 1884, No. 5,402.

*To all whom it may concern:*

Be it known that I, LUDOVIC LABORDE, a citizen of the Republic of France, and residing at Fleurance, Department of Gers, France, have invented an Improved Apparatus for Destroying Phylloxera, &c., (for which I have obtained a patent in France, dated July 31, 1883, No. 156,822,) of which the following is a specification.

My invention consists of improvements in the construction of apparatus for the destruction of phylloxera by introducing into the roots of the plants in the ground a suitable insecticide fluid, as fully described and claimed hereinafter.

Figure 1:
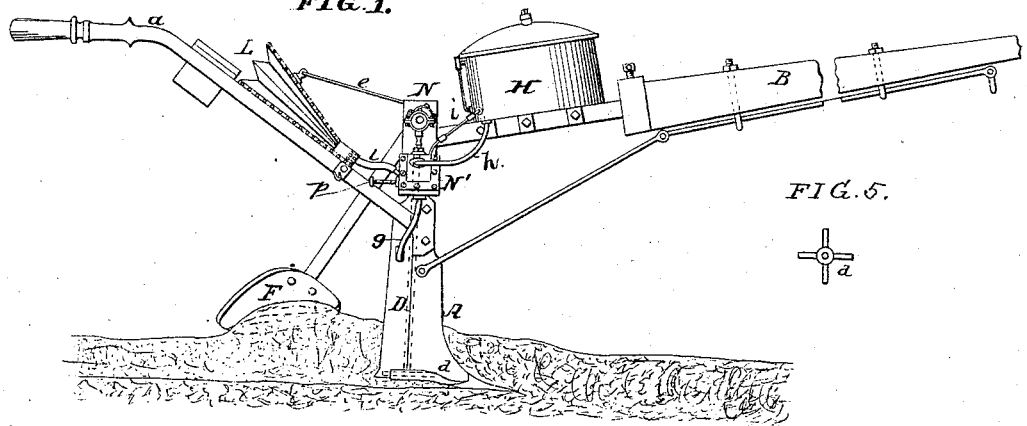
Figure 2:
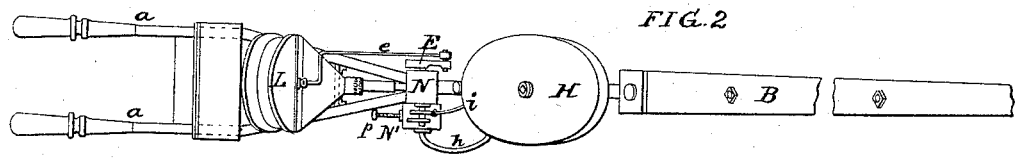
Figure 4:
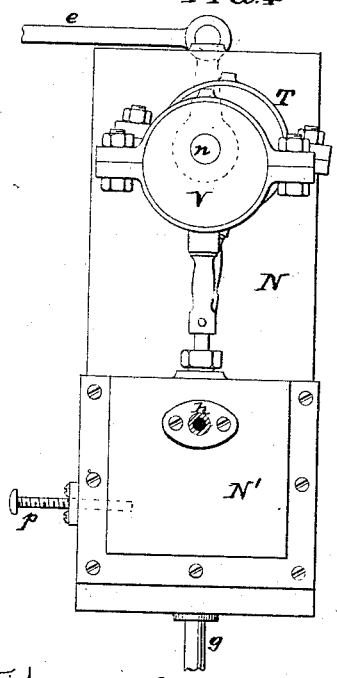
Figure 3:
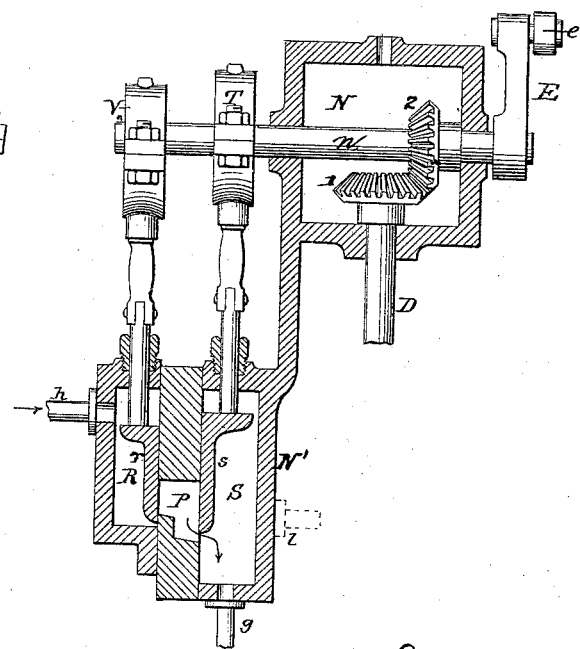

In the accompanying drawings, Figure 1 is a side view of my improved apparatus. Fig. 2 is a plan view. Fig. 3 is a sectional view drawn to an enlarged scale of a portion of the apparatus. Fig. 4 is a side view of the same, and Fig. 5 is a plan view of the wheel by which motion is imparted to the operative parts of the machine.

The apparatus, in its general construction, somewhat resembles a plow, of which A is the hollow share and B the forwardly-projecting tongue, to which the draft-animals are to be harnessed to draw the machine, and $a\,a$ are the usual guiding-handles.

Figure 5:

Motion is imparted to the operative portions of the machine by a star-wheel, $d$, Figs. 1 and 5, on the lower end of a vertical rod, D, Figs. 1 and 3, the rotation of this wheel being caused by its arms coming in contact with the ground as the plow is drawn forward. The vertical shaft D extends upward through the hollow plowshare into a box, N, on the upper part of the frame, and, by means of the beveled gearing 1 2, imparts rotary motion to a horizontal shaft, $n$, operating two eccentrics, V T, which control the slides of the distribution-box, as hereinafter described.

On some portion of the frame (in this instance on the rear of the tongue) is secured a box or receptacle, H, for receiving the insecticide fluid, and this communicates, through a pipe, $h$, with the distribution-box N', which consists of two chambers, R and S, and an intermediate chamber, P, the chamber S having at its lower end a discharge-pipe, $g$, extending, as shown in Fig. 1, down into the interior of the plowshare, where the fluid is to be discharged into the ground.

The communications between the central chamber, P, and the two chambers R and S are closed by slides $r$ and $s$, which are, respectively, under the control of the eccentrics V and T, as before described, these eccentrics being relatively so arranged that when one slide is open the other slide will be closed. In this way the liquid is transferred from the chamber R into the chamber S in measured quantities, and in order to vary this quantity to the desired extent, the chamber P is provided with a screw, $p$, by adjusting which, inward and outward, the capacity of the chamber may be varied by the consequent displacement.

On a suitable part of the frame (in this instance on the handles $a$) is mounted a bellows, L, which is operated from the rotary shaft $n$ through the crank E and connecting-rod $e$, and the nozzle $l$ of these bellows opens into the chamber S or pipe $g$, and the air from said bellows forces the liquid which enters from the chamber P out through the pipe $g$, and volatilizes the liquid at its exit from the latter, expanding it into the furrow made by the plow.

From the upper part of the chamber S extends a small pipe, $i$, to the upper part of the receptacle H, so as to furnish there a pressure of air.

I prefer, also, to attach to the plow a mold-board, F, which, following after the plowshare A and distribution apparatus, covers up the the furrow and the fluid injected into the ground, so as to greatly reduce the loss by evaporation.

I claim as my invention—

1. The combination of the plow, a fluid-reservoir, bellows, and distribution-box with a vertical shaft, D, carrying at its lower end a horizontal wheel for imparting motion to the operative parts of the machine, substantially as set forth.

2. The combination of the plow and fluid-reservoir with a distribution-box, N', consisting of three chambers and slides alternately opening and closing the communications between the central and outer chambers, as and for the purpose set forth.

3. The combination of the plow and fluid-reservoir with a distribution-box, consisting of three chambers and controlling-slides, and a screw for regulating the capacity of the central chamber, as described.

4. The combination of the plow, fluid-reservoir, distribution-box, and controlling-slides with a vertical rod, D, carrying at its lower end a wheel to come into contact with the ground, a shaft, $n$, geared to the rod D and carrying eccentrics operating the said slides, substantially as specified.

5. The combination of the plow, fluid-reservoir, distribution-box, and slides with a pair of bellows communicating with the distribution-box and mounted on the plow-handles, vertical rod D, carrying at its lower end a wheel to come into contact with the ground, and a shaft, $n$, geared to the rod D, and carrying a crank to operate the bellows, substantially as set forth.

In testimony whereof I have signed my name to this specification in the presence of two subscribing witnesses.

LUDOVIC LABORDE.

Witnesses:
JOSEPH DELAGEY,
EDOUARD BUCHWALD.